Nov. 11, 1969 J. A. PERSCHY 3,478,223
CONTROL SYSTEM FOR A CURRENT STEERING SWITCH
Filed Dec. 1, 1965
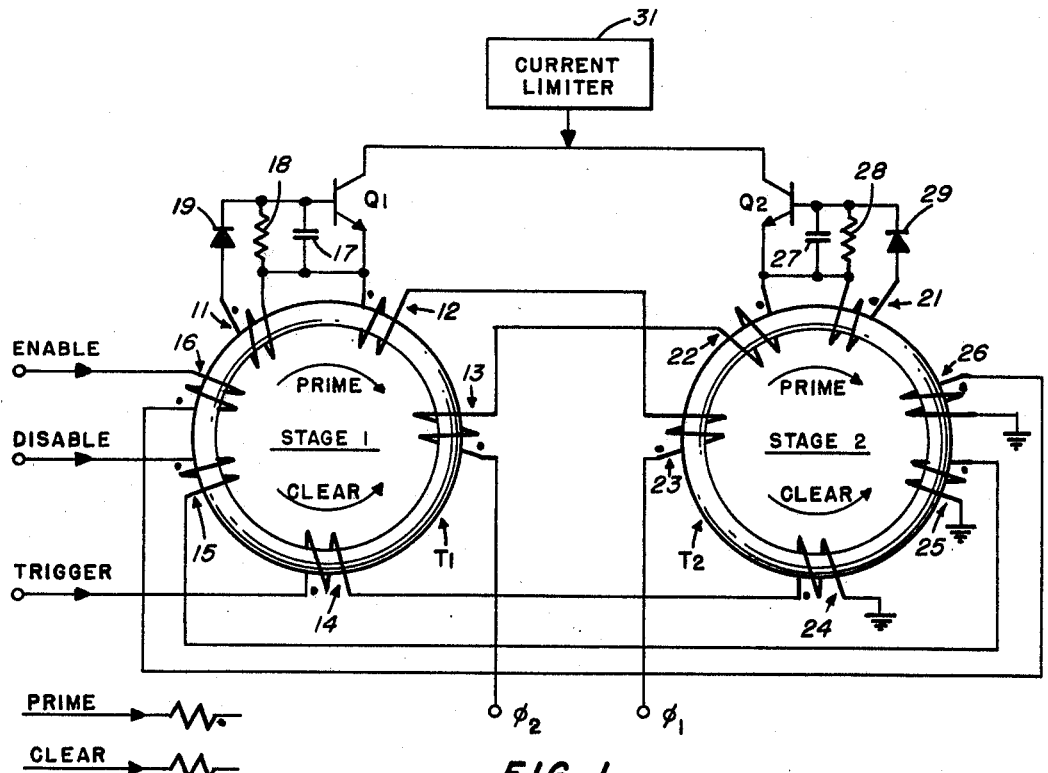
FIG. 1
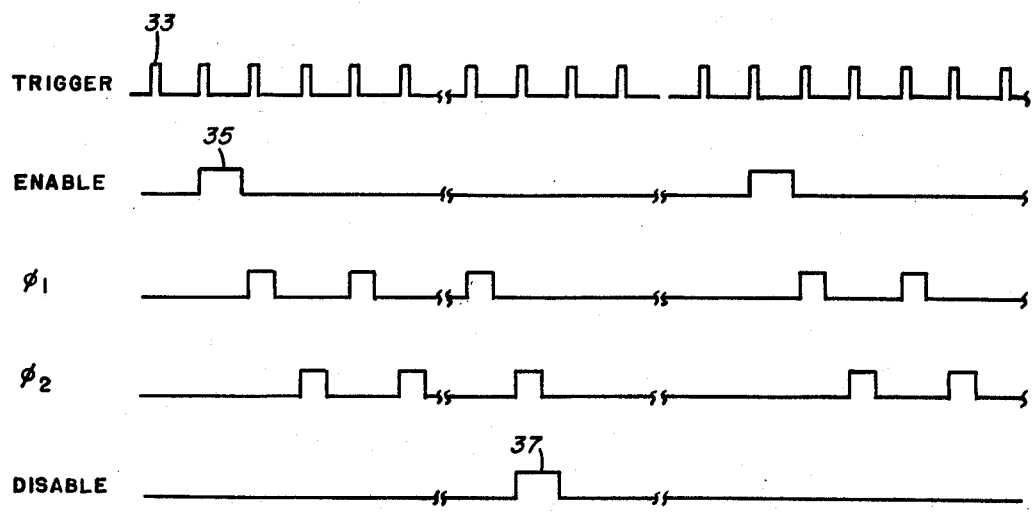
FIG. 2
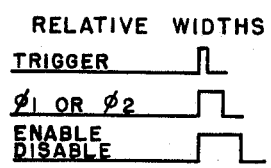
INVENTOR
JAMES A. PERSCHY
Claude Funkhouser
BY ATTORNEY
Leonard L. Lowrie
AGENT United States Patent Office 3,478,223
Patented Nov. 11, 1969

3,478,223
CONTROL SYSTEM FOR A CURRENT
STEERING SWITCH
James A. Perschy, Laurel, Md., assignor to the United
States of America as represented by the Secretary of
the Navy
Filed Dec. 1, 1965, Ser. No. 511,298
Int. Cl. H01f 27/42, 29/02
U.S. Cl. 307—88                                    5 Claims

ABSTRACT OF THE DISCLOSURE

This invention is directed to a current steering switch which has a plurality of cascaded stages. Each stage utilizes a magnetic core which has a first and second magnetic stability state. Initiate, trigger and stop windings are connected in series to each core. The initiate windings, upon receipt of a pulse, place one core in the first state of stability and the others in the second state. The trigger windings receive pulses which tend to shift the state of a core which is in the one state. Responsive means utilizing two further windings and a transistor are coupled to each core. It operates with the trigger pulses to complete the change of state of a core in the first state and to change the state of the core in the next succeeding state from the second state to the first state. The stop windings are operative to change all cores to the second state and stop the operation of the switch until the initiate windings receive a further pulse.

---

The present invention relates to a current steering switch and more particularly to a system for controlling a transistorized magnetic core pulse operated current steering switch for use in a satellite magnetic core memory system.

In order to stop or start a current steering switch in the prior art, static flip-flops, diode gates and buffer circuits are ordinarily required to make this type of circuitry compatible with pulsed magnetic circuits in a current steering switch or driver.

An object of the present invention is to provide simplification in the control of a current steering switch that will use fewer components and consume less power.

Another object of the present invention is to provide an improved current steering switch which can be stopped or started at any time.

A further object of the present invention is to provide a circuit for a current steering switch which permits the setting, switching, disabling and resetting or reindexing at any trigger pulse or clock time eliminating the need for conventional logic circuits.

Other objects, advantages and novel features of the invention will become apparent from the following detailed description of the invention when considered in conjunction with the accompanying drawings wherein:

FIG. 1 is an electrical circuit schematic diagram illustrating two stages of a current steering switch using the control system of the present invention; and FIG. 2 is a timing diagram useful in explaining the operations of the circuit of FIG. 1.

Referring now to the drawings, FIG. 1 shows an electrical circuit for a current steering switch having two stages for the purpose of illustrating the present invention. Any number of stages could be used together connected in a cascaded manner depending upon the number of outputs required.

Each stage includes a magnetic core, bar or toroid having six windings or coils. Stage 1 has a magnetic core T1 and coils 11, 12, 13, 14, 15 and 16. Similarly, stage 2 has a core T2 and six windings 21, 22, 23, 24, 25 and 26. By the application of a proper current to a winding, the lines of magnetic flux through a magnetic core can be driven in either of two directions or states of magnetic stability. For ease of explanation of the steering switch of the present invention, the different stable states of magnetic remanence will be referred to as the prime or "1 state" for the clockwise direction of the lines of magnetic flux and clear or "zero state" for the counterclockwise direction of the lines of flux. Furthermore, the dot notation place at one terminal of each winding indicates that a current flowing into the undotted end of a winding will drive a core from the "zero state" to the "1 state." Accordingly, current flowing into the dotted end of a winding will drive a magnetic core from the 1 state to the 0 state. It is to be noted that the remnant flux in a core depends upon the direction of lines of magnetic flux caused by the previous application of current to a winding.

Each state of the current steering switch includes similar circuit elements. Referring to FIG. 1, stage 1 has transistor Q1 having a collector, base and emitter electrodes with the first winding 11 connected from the emitter to the base and the second winding 12 connected to the emitter. To supply the necessary biasing to the transistor, the collector of Q1 is connected to a current limiter 31. The first winding 11 is also arranged across a capacitor 17, and resistor 18, which make the transistor Q1 act as a monostable blocking oscillator in conjunction with the second winding 12. Diode 19 prevents base to emitter breakdown when core T1 is primed. The winding 11 could also be designated as the driven winding and winding 12 as the driver for feedback in the operation of the blocking oscillator. In the first stage, the second winding 12 is connected in series with the third winding 23 of the core T2 of the succeeding stage 2. FIG. 1 shows second winding 22 of core T2 of stage 2 connected to the third winding 13 of the first stage for the purpose of explanation. However, more than two stages could be connected in cascade from second winding to the third winding of the succeeding stage until the last stage whose second winding is connected to the third winding of the first stage.

To each stage, the fourth windings 14, 24 are connected in series to which a series of trigger or clock pulses are applied. The fifth windings 15, 25 of each of the stages are connected in series to which a disabling pulse is applied from input sequencing circuits, not shown. The sixth windings 16, 26 of each core T1 and T2 are connected in series except one of the windings is wound in reverse direction from the other one. In a series of cascaded stages, the sixth windings are connected in series with only one of the windings reversed wound from all the remaining sixth windings for the application of an enabling pulse thereto.

From input sequencing circuits, a train or series of trigger pulses 33, as indicated on diagram of FIG. 2, are applied continuously without interruption to the trigger windings 14 and 24.

At any required or starting time, an enabling pulse 35 of longer duration than the trigger pulse as shown by the diagram of FIG. 2 is applied to the sixth windings of each magnetic core of each stage. Since the enabling pulse 35 is of longer duration than a trigger pulse 33 and the output pulses $\phi_1$, $\phi_2$ and since winding 16 on core T1 is wound in the reversed direction than the other sixth windings, the positive current flowing into the undotted winding 16 of core T1 would cause the lines of flux to be in the clockwise direction, the prime or 1 state of magnetic stability. For all other sixth windings, the enabling pulse is fed to the dotted end of a coil causing all other magnetic cores to be placed in the zero or clear state of magnetic stability. Thus, the enabling pulse sets the current steering switch in condition for switching by the trigger pulses.

Since the trigger pulse is applied to the dotted end of a coil, current flowing into the dotted end of a coil causes the magnetic lines of flux to be in the counterclockwise direction or clear state of magnetic stability. Any magnetic core in the clear state will remain in the clear state upon application of a trigger pulse. However, since the magnetic core T1 of stage 1 is in the prime state from the action of the enabling pulse, the trigger pulse will switch or initiate the changing of the magnetic core T1 from the prime state to the clear state of magnetic stability. When the trigger pulse causes a change in direction of magnetic flux in core T1, this induces a current to flow out of the driven or first winding 11 causing the bias on the base of transistor Q1 to change starting the transistor to conduct current from collector to emitter like a blocking oscillator. The change of transistor emitter current or output pulse $\phi_1$ is applied to driver feedback or second winding 12 which enhances the reversal of magnetic flux from the prime state to the 0 state and feeds back this additional change in flux to the driven feedback winding 11 to maintain the transistor in conduction beyond the pulse time or width of the trigger pulse until the magnetic core T1 is completely cleared. Then the magnetic core searches the clear state and since the flux does not change any more due to the lack of current change in coil 12, the transistor acts like a monostable blocking oscillator. Since there is no feedback from the driver winding 12 to the driven winding 11, the transistor will stop conducting.

Since the coil 12 is connected in series with coil 23 of the magnetic core T2, this change in emitter current or output pulse $\phi_1$ of transistor Q1 when placed in conduction is fed to the undotted end of coil 23 to place the magnetic core T2 of the succeeding stage into the prime state of stability from the 0 state. Because of the arrangement of the windings 21 and 22 and the diode 29 of stage 2, this change in flux of the magnetic core T2 does not cause any switching action in stage 2.

Now that stage 2 is in the prime state of magnetic stability, the application of the next trigger pulse will cause stage 2 to act like a monostable blocking oscillator. The operation of stage 2 is similar to that of stage 1 where stage 2 exhibits an output pulse $\phi_2$ at the dotted end of coil 13 and in sequence in time after output pulse $\phi_1$, as shown in FIG. 2.

Since a magnetic core in combination with the blocking oscillator in the prime state of stability upon application of a trigger pulse thereto primes the core of the succeeding stage, an application of a series of trigger pulses would produce a series of output pulses $\phi_1$ and $\phi_2$ sequentially depending upon the number of stages in the switch.

When it is required to stop the switch from producing a series of output pulses, a disabling pulse 37 is applied to the fifth winding of each magnetic core. The disabling pulse is similar to an enabling pulse in that it is of sufficient duration so that the application of such a pulse to the dotted end of each fifth winding will cause any of the magnetic cores in the prime state to be changed to the clear state overriding the action of a trigger pulse on a core that is in the prime state or the action of an output pulse for priming a succeeding stage as shown in middle portion of FIG. 2. The effect of the disabling pulse is to have no magnetic core in a prime state of magnetic stability. When the next trigger pulse is applied to the switch after a disabling pulse, no stage has an output pulse as shown in the middle portion of FIG. 2, since all magnetic cores are in the clear state of magnetic stability. As a result, the current switch can be stopped without interrupting or stopping the series of trigger pulses. When the memory system is ready for operation again, an enabling pulse is applied to the sixth windings to reset one of the magnetic cores to the 1 state of magnetic stability to place the current steering switch in condition for switching on reception of the next trigger pulse.

Obviously many modifications and variations of the present invention are possible in the light of the above teachings.

What is claimed is:

1. A control system for a current steering switch having a plurality of cascaded stages comprising:
    bistable magnetic means for each stage having first and second active states of stability;
    setting means for each stage magnetically coupled to said bistable means of each stage for receiving an enabling pulse which causes the bistable means of a first one of said stages to be in the first stage of stability and the bistable means of all the remaining stages to be in the second stage of stability;
    initiating means for each stage magnetically coupled to said bistable means of each stage for receiving a continuous series of trigger pulses and operable to cause the bistable means of each stage to start switching from the first state of stability when said bistable means are in the first state of stability;
    responsive means for each stage magnetically coupled to said bistable means of each stage;
    the responsive means for a given stage being operative to establish an output pulse when the initiating means associated with said given stage causes the bistable means to start switching from the first state of stability;
    priming means for each stage magnetically connected to the bistable means of each stage and electrically connected to the responsive means associated with the preceding stage, the last stage being the preceding stage of the first stage, said priming means being operable upon receipt of an output pulse from the responsive means to which it is connected to change the state of stability of the bistable means to which it is coupled; and
    stopping means for each stage magnetically coupled to said bistable means of each stage for receiving a disabling pulse causing each bistable means of each stage to be in the second state of stability.

2. The control system of claim 1 wherein:
    said bistable means comprises a magnetic element capable of being magnetized in either of said first and said second state of magnetic stability;
    each of said responsive means comprises driven and driver windings mounted on one of the magnetic elements and connected in combination with a transistor having a control and output electrode, said driven winding being connected to said control electrode and said driver winding being connected to said output electrode; and
    each of said initiating means comprises a trigger winding mounted on one of the magnetic elements and connected in series between the magnetic elements of each stage;
    said driven windings being operative to drive said transistors into conduction when the magnetic element to which they are connected start switching from the first state to the second state of stability in response to a pulse from said initiating means thereby causing output pulses to flow from the output electrodes of said transistors through the driver windings to which they are connected to complete the change of state of the magnetic elements.

3. The control system of claim 2 wherein each of said priming means comprises a priming winding mounted on one of the magnetic elements, the driver winding of the responsive means being connected in series with each of said priming windings and each of said priming windings being connected in series with the driven winding of the immediately preceding stage, said priming winding being arranged in opposite manner from said driver winding on said magnetic element whereby the application of the output pulse from said driver winding causes said magnetic element of said immediately succeeding stage to change to a one state of magnetic stability for placing said responsive means and said bistable means of said succeeding stage into condition for operation upon receiving the next trigger pulse of said series trigger pulses for producing a sequence of output pulses in coincidence with said series of trigger pulses.

4. A control system of claim 1 wherein each of said stopping means is connected in series with each of the other stopping means.

5. A control system of claim 4 wherein each of said setting means comprises an enabling winding coupled to said bistable means of each stage, said enabling windings on each of said bistable means connected in series and having one of said windings arranged in the opposite manner from the remaining of said enabling windings.

References Cited
UNITED STATES PATENTS

| | | | |
|---|---|---|---|
| 3,087,071 | 4/1963 | Richards | 307—88 |
| 3,130,321 | 4/1964 | Maley et al. | 307—88 |
| 3,191,060 | 6/1965 | Mahoney | 307—270 |
| 3,202,831 | 8/1965 | Olson | 307—314 |

BERNARD KONICK, Primary Examiner

BARRY L. HALEY, Assistant Examiner

U.S. Cl. X.R.

307—270; 340—174